UNITED STATES PATENT OFFICE.

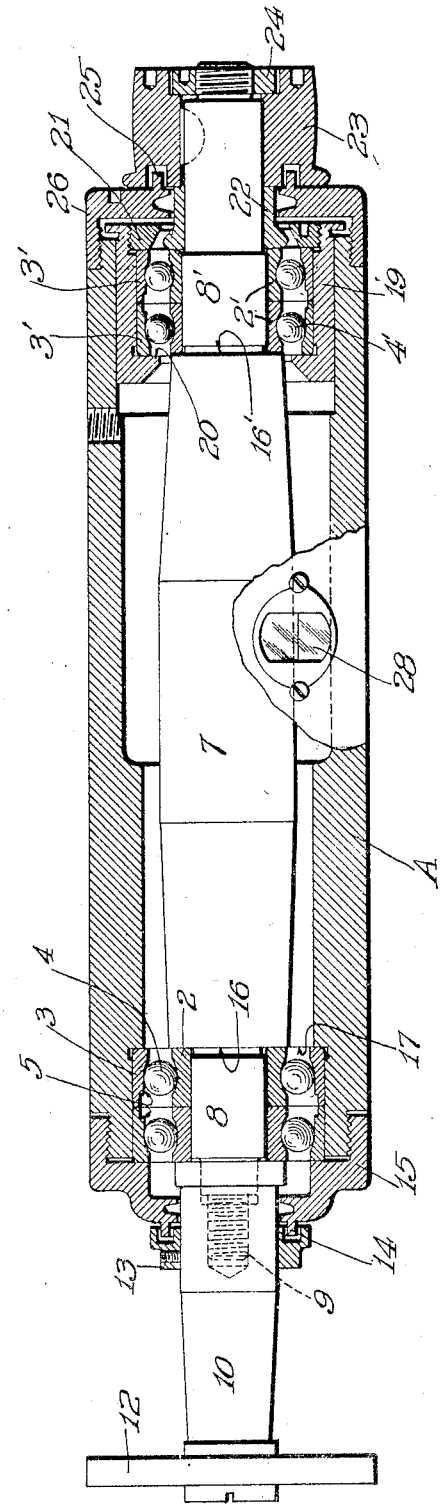

CHARLES E. VAN NORMAN, OF SPRINGFIELD, MASSACHUSETTS.

TOOL-CARRYING SPINDLE.

1,339,308.  Specification of Letters Patent.  Patented May 4, 1920.

Application filed February 18, 1918. Serial No. 217,981.

*To all whom it may concern:*

Be it known that I, CHARLES E. VAN NORMAN, a citizen of the United States, and a resident of Springfield, in the county of Hampden and State of Massachusetts, have invented certain new and useful Improvements in Tool-Carrying Spindles, of which the following is a specification.

This invention relates generally to tool-carrying spindles which are adapted to operate with precision at high speed and more particularly to improved bearing surfaces therefor.

Spindles, for grinding wheels and the like, which operate at high speed and are intended for precise work, such as the grinding of ball races and the like, involve problems of a special nature in the provision of suitable supporting bearings for the spindle. Such spindles, since they operate at very high speeds, should be mounted in their bearings with a "floating" member. That is, the spindle must be capable of a certain degree of axial movement to freely permit the expansion and contraction which takes place on changing temperatures when it is heated as by rotation at high speed or otherwise. In ball-bearing spindles as heretofore constructed, one of the bearings is slidable directly on the spindle casing and may be moved by endwise expansion and contraction of the spindle. The ball-bearings so employed are usually of the so-called self-contained type, wherein the inner and outer rings together with the balls therebetween are held together and may be removed and replaced as a unit. They are not arranged for adjustment to compensate for wear. Furthermore, the movable or floating bearing being directly engageable with the casing and being relatively narrow, soon wears a seat in the casing by the movement due to the repeated expansion and contraction of the spindle. The bearings and the casing cannot be permitted to wear to any great extent where the spindle is, as here, intended to support a tool which is to accomplish precise work, as the spindle for such purposes must be at all times held in exactly adjusted and concentrical position within the casing.

This invention makes use of ball-bearings, preferably of an open type, which are capable of compensatory adjustment from time to time and are mounted in the spindle casing so that they may be conveniently removed for adjustment. One bearing is arranged to float as described, but this floating bearing is not directly engageable with the spindle casing, as heretofore, but is purposely mounted and securely fixed in a separable part of the casing, which separable part or container is arranged to slide in the casing rather than the relatively narrow ball-bearing itself, as formerly. This slidable part is so designed as to give long service with a minimum of wear. The importance of eliminating the sliding movement of the bearing itself may be best appreciated by considering an example of the prior practice. Where the ball-bearing itself is slidable, the outer and inner rings and the balls themselves are worn and so also is the part of the casing on which the outer ring slides. The result is that a bearing of the self-contained type, when it becomes slightly worn, is no longer fit, with a high-speed spindle, for precision work, since no provision is made for adjustment purposes. Thus, the bearing, when only slightly worn, must be discarded as unfit for the present purposes. There is, however, another and more prominent disadvantage, which is due to the direct sliding of the outer ball-bearing ring on the casing. The latter wears at a relatively rapid rate by repeated sliding and slow rotation or creeping of the relatively narrow outer ring thereon, and the result is that even a new self-contained ball-bearing fails to support the spindle in the precise manner desired, for the bearing will not fit in the worn seat of the casing so as to support the spindle in the desired accurately-adjusted concentrical position therein.

The main object of this invention is to provide, in combination with a high-speed spindle, bearing devices therefor which may be conveniently removed and adjusted or taken up for wear, one of these bearings being movable with a floating container or sleeve which is arranged to contain and securely hold the movable bearing and to slidably engage the casing as distinguished from direct engagement therewith by the bearing itself, said container being constructed and arranged to receive a standard ball-bearing without being worn thereby and to slide in the casing with only a minimum amount of wear on the latter.

Other objects and advantages will appear in the description to follow and will be particularly pointed out in the appended claims.

The invention, in an embodiment at present preferred, is shown for illustrative purposes in the accompanying drawing, in which—

The figure shows a sectional elevation of a high-speed tool-carrying spindle embodying the invention.

Referring to the drawing in detail, A represents the spindle casing which may be supported by any suitable means (not shown). One end of casing A is recessed to receive a ball-bearing device. This bearing device, of the so-called open type, preferably may, for example, comprise a pair of inner rings 2 and a pair of outer rings 3 with a series of balls 4 arranged therebetween. The inner rings 2 have the ordinary raceway formed on their exterior surface, while the raceway formed on the interior surface of outer rings 3 is of a special character. Thus, the adjacent portions of the rings 3 are formed with substantially horizontal surfaces 5 instead of curved shoulders as in the inner rings 2. This construction is important for the reason that contiguous end faces of each pair of rings 2 and 3 may be faced off a slight amount from time to time to permit the rings to be moved closer together and bring new unworn surfaces thereof in engagement with the balls. Thus, as the balls 4 and rings 2 and 3 wear, they may be adjusted in the manner described to take up the slack therein so that the axis of the inner rings 2 may be maintained in exact concentrical relation with the spindle casing A. Obviously, other types of ball-bearings may be employed, as desired, to provide for the compensating adjustments described.

The spindle is represented by reference 7 and has a shouldered-down portion 8 which fits into the hole in inner rings 2, and, beyond the portion 8, is a threaded portion 9 of still further reduced diameter. The portion 9 is adapted to receive an arbor 10 which carries a suitable tool 12, such as a grinding wheel, for example. A suitable dust cap 13 is fixed on arbor 10 and is formed with a circular groove to receive a circular fin 14 formed on the end of a cap 15 which is threaded upon the end of casing A, as shown. The cap 15 bears against an end face of one of the outer rings 3, and the arbor 10 bears against the end face of a corresponding ring 2 so that the rings 2 and 3 may be forced against shoulders 16 and 17 formed, respectively, on spindle 7 and casing A. It is particularly to be noted that arbor 10 and cap 15 are not in abutment with the portion 8 and casing A, respectively, so that as the contiguous faces of each pair of rings 2 and 3 are faced off slightly from time to time, the pairs of rings 2 and 3 may still be forced together and against shoulders 16 and 17, as described.

It will be seen from the figure that the spindle 7 and arbor 10 are of substantially equal diameter and that by "shouldering down" the portion 8, the exterior of rings 2 may be made substantially equal in diameter to the members 7 and 10. It is particularly desirable in high-speed tool-carrying spindles adapted for precise work to have the arbor and spindle substantially equal in diameter and of sturdy construction to obtain in spite of high-speed operation that degree of rigidity of parts which is essential to the performance of precision work. That is, to accomplish precise work, the arbor 10 must not spring or be deflected readily either by the centrifugal force of the fast revolving spindle or by the pressure of the wheel 12 on the work. The difficulty, heretofore, has been that in order to make the several described parts of substantially equal diameter, the bearings have had to be enlarged to receive the spindle, and the enlargement of the bearings makes necessary an enlargement of the casing. Generally, bearings of a special nature must be used. The present construction employs a ball-bearing device which is a standard commercial article and the spindle is reduced in diameter to receive it. However, since the rings 2 are clamped between the members 7 and 10 and are rotatable therewith, they are, in effect, a part of the spindle, with the result that the desired uniformity of diameter and rigidity of construction is obtained without resorting to special construction of bearings.

The other end of spindle 7 is similarly shouldered down as indicated by reference 8', and the portion 8' is mounted in a ball-bearing device similar to that already described, the corresponding parts having similar but primed reference numerals. The rings 3', however, do not directly engage casing A but fit into a part 19 and at one end bear against a shoulder 20 thereon. The rings 2' abut a shoulder 16' on spindle 7. Threaded into the other end of part 19 is a nut 21 which may be turned by a suitable spanner wrench to engage rings 3' and force them against shoulder 20. Mounted on the spindle to the right of portion 8' is a collar 22 which is adapted to engage the outer ring 2', and beyond the collar is a driving pulley 23, slidably keyed to the spindle. Pulley 23 may be moved axially on the spindle by a nut 24 to move collar 22 and thus move rings 21 until one of them abuts shoulder 16'. The pulley 23 is provided on one face with a suitable circular groove to receive a circular fin 25 formed on the end of a cap 26 which is threaded upon casing A.

It will thus be seen that the right-hand set of ball-bearings for spindle 7 are adjustable in a manner similar to the left-hand set, so that the axis of rings 2' may be maintained in exact concentrical relation with the sleeve 19. Nuts 21 and 24 do not abut the sleeve 19 and spindle 7, respectively, but are capable of being turned a still further distance from the position shown to clamp the rings 2' and 3' in position even after the rings have been repeatedly faced off.

The bearings described may be lubricated in any suitable manner. Preferably, casing A is recessed intermediate the bearings as shown, and the recess formed may receive the lubricating medium. The casing A may further be provided with a suitable window 28 through which the level of the lubricating medium may be conveniently observed.

It will be seen from an inspection of the figure that the outer rings of the left-hand bearing are fixed, being held between cap 15 and shoulder 17, and the inner rings are held thereby through the intermediary of the balls 4. The right-hand bearing, however, is movable with the spindle so that the latter is free to move axially when heated by operation at high speed or otherwise affected by changing temperature. The spindle, as it moves, carries rings 2' therewith and the latter move the balls 4', and the right-hand end set of balls 4' move the rings 3'. The rings 3' being held in the sleeve 19 cause the latter to be moved. The construction is such that only the sleeve 19 has a slidable engagement with the casing A. The sleeve is designed for a relatively long life so that the wear thereon and on the casing is minimized; and as the sleeve is also made relatively longer than a ball-bearing ring, it has been found that the sleeve and casing may slide the one relatively to the other over long periods of time without appreciable wear. Should the sleeve 19 become worn or defective, a new sleeve may be fitted to the casing, thus permitting the continued use and replacement of the same standard type ball-bearings and prolonging the life of the spindle and of the casing indefinitely. The wear of the raceways in the rings and the balls may be taken up from time to time in the manner heretofore described. Moreover, the rings, balls, and sleeve 19 may be readily renewed, as the need for each appears, in a most convenient manner, and the spindle at all times may be kept in condition for work of the highest accuracy.

The bearings described have been termed ball bearings, since balls are generally used as the rolling members of the bearings used for this class of work. It will be obvious, however, that rolling members of any other type may be used, if desired, and the invention is independent of the type of rolling members employed. In the preceding description of the preferred embodiment of the invention, both inner trackways and both outer trackways of each bearing have been shown as separable to permit the desired take up for wear. It will readily be apparent, however, that the same result may be obtained if only the outer trackways or only the inner trackways are separable.

Thus, improved bearing devices have been provided to support a tool-carrying spindle in an accurate manner for high-speed operation on work of precise character. The bearing devices are particularly characterized in that they are adjustable to permit the maintenance of an accurate support and in that the spindle may be supported for floating movements without thereby interfering with the accuracy of the support due to wear caused by the floating movements of the spindle, or the necessary replacement of any of the bearing parts.

The invention has been described in a preferred form for illustrative purposes, but the scope of the invention is defined by the appended claims rather than by the foregoing description.

What I claim is—

1. In combination with a high speed spindle, a casing therefor, a bearing for the spindle near one end of the casing, a sliding container near the other end of the casing, and a pair of bearings for the spindle and located within the container, the last-named bearings comprising, means attached to the spindle and affording two circular trackways, means contacting with the inner periphery of the container and held against endwise movement therein to afford two trackways in operating alinement with the first-named trackways, and a set of rolling members between each mating pair of trackways, one of said means including two separable rings, and adjustable means to confine them in operative relation with the rolling members.

2. In combination with a high speed spindle, a casing therefor, a bearing for the spindle near one end of the casing, a sliding container near the other end of the casing, and a pair of bearings for the spindle and located within the container, said last-named bearings comprising, means attached to the spindle and affording two spaced trackways, a pair of outer rings each with a trackway in operating alinement with one of the first-named trackways, and two sets of rolling members riding in and disposed between said trackways, the outer rings contacting with the inner circumferential wall of the container, and means including an axially adjustable member to confine the outer rings against endwise movement in the container.

3. In combination with a high speed spindle, a casing therefor, a bearing for the spindle near one end of the casing, a sliding container near the other end of the casing, and a pair of bearings for the spindle and located within the container, said last-named bearings comprising, means held against endwise movement in the container and affording two circular trackways, a pair of inner rings attached to the spindle and each affording a circular trackway to aline with one of the first-named trackways, a set of rolling members between each pair of mating trackways, and adjustable means on the spindle to confine said rings in operating relation with the rolling members.

4. In combination with a high-speed spindle, a casing therefor, a ball-bearing device for each end of the spindle, each of said devices comprising inner and outer relatively-rotatable rings with balls therebetween, an element slidable in one end of the casing and arranged to hold the outer rings of one device, means to hold the outer rings of the other device to the casing, said spindle having necked-down portions adjacent each end to receive said inner rings, means to clamp the latter to the spindle, said last-named means including at one end a tool-carrying arbor, the diameter of which is substantially equal to that of the spindle adjacent the necked-down portion and to the external diameter of the inner rings on said necked-down portion, all constructed and arranged so that the arbor, inner rings, and spindle are effectively held together to constitute one rigid rotatable member of substantially uniform diameter.

5. In combination with a high speed spindle, a casing therefor, a sliding container free to float axially in one end of the casing, a bearing in the container and a bearing in the other end of the casing to rotatably support the spindle, said last-named bearing comprising, means held in the casing and affording two trackways, means on the spindle and affording two trackways in operating alinement with the first-named trackways, and a set of rolling members between each set of mating trackways, one of said means including two separable rings, and axially adjustable means to confine them in proper adjusted relation with the rolling members.

6. In combination with a high speed spindle, a casing therefor, a sliding container free to float axially in one end of the casing, bearings to rotatably support the spindle, one of said bearings being carried by said container and each bearing comprising, inner and outer rings affording two axially spaced trackways and rolling members between each pair of mating trackways, the inner rings being held to the spindle and the outer rings in said casing and said container, one trackway of each pair being separable from the corresponding trackway of the other pair to permit adjustment of the axial space therebetween, and adjustable means to confine the separable trackways in operating relation with the rolling members.

7. A device to support and rotate a high-speed tool, comprising in combination, a spindle, a casing having spaced bearing supports comprising ball-races, a tool-arbor and ball-races, one end of said spindle being necked down to receive ball-races and said tool-arbor both of which are of an outside diameter approximately equal to the spindle diameter adjacent the necked-down portion, the other end of said spindle being likewise necked down to receive like ball-races, and balls between the ball-races on the spindle and the spaced bearing supports.

8. In combination with a high speed spindle, a casing therefor, a sliding container free to float axially in one end of the casing, a bearing in the container and a fixed bearing in the other end of the casing to rotatably support the spindle, each bearing comprising, means held in the casing or said container to afford two axially spaced circular outer trackways, means held to the spindle to afford two axially spaced circular inner trackways, a set of rolling members between each inner and outer trackway, either the inner or outer pair of trackways of each bearing being formed in separable rings which may be adjusted to vary the space between the trackways, and adjustable means to confine the separable rings of each bearing in operative relation with their rolling members, the separable rings of the fixed bearing permitting a take up for axial and radial wear and the like rings of the bearing in said container permitting a take up for radial wear.

9. In combination with a high speed spindle, a casing therefor, a bearing for the spindle fixed near one end of the casing, a sliding container free to float axially in and near the other end of the casing, a bearing for the spindle and located within the container, the latter having a cylindrical opening and an inwardly extending flange to encompass the opening at one end, said bearing including inner and outer rings each affording a trackway, and rolling members between each set of mating trackways, the outer rings contacting with the circumferential wall of said opening and one ring abutting with said flange, and adjustable means to move the other outer ring against the rolling members and the first-named outer ring against said flange.

CHARLES E. VAN NORMAN.